United States Patent [19]

Shimada et al.

[11] Patent Number: 4,773,060
[45] Date of Patent: Sep. 20, 1988

[54] OPTICAL INFORMATION RECORDING DEVICE

[75] Inventors: Satoshi Shimada; Yoshio Sato; Hiroshi Sasaki, all of Hitachi; Nobuyoshi Tsuboi, Toukai; Tetsuo Ito, Mito; Hideki Nihei, Hitachi; Norifumi Miyamoto, Hitachi; Hiroaki Koyanagi, Hitachi; Kanji Kawakami, Mito, all of Japan

[73] Assignee: Hitachi, Ltd., Tokyo, Japan

[21] Appl. No.: 804,163

[22] Filed: Dec. 3, 1985

[30] Foreign Application Priority Data
Dec. 3, 1984 [JP] Japan ............................ 59-255318

[51] Int. Cl.4 ............................................ G11B 11/00
[52] U.S. Cl. ...................................... 369/100; 369/13; 369/111; 369/286; 369/284; 365/122
[58] Field of Search .............. 369/15, 100, 126, 111, 369/288, 286, 284; 346/135.1, 137, 76 R; 365/113, 122

[56] References Cited

U.S. PATENT DOCUMENTS

| 4,219,927 | 9/1980 | Tukutomi | 174/68.5 |
| 4,550,346 | 10/1985 | Hatano | 369/13 |
| 4,629,649 | 12/1986 | Osaka | 346/76 L |
| 4,677,601 | 6/1987 | Ohta | 369/13 |

FOREIGN PATENT DOCUMENTS

| 136801 | 4/1985 | European Pat. Off. | 369/100 |
| 2024374 | 5/1970 | Fed. Rep. of Germany | 369/100 |
| 2234890 | 7/1972 | Fed. Rep. of Germany | 174/68.5 |
| 2838241 | 3/1979 | Fed. Rep. of Germany | 174/68.5 |
| 59-79436 | 5/1984 | Japan | 369/100 |

OTHER PUBLICATIONS

National Technical Report, vol. 29, No. 5 (1983).

*Primary Examiner*—Alan Faber
*Attorney, Agent, or Firm*—Antonelli, Terry & Wands

[57] ABSTRACT

A film of a crystal - crystal phase transformation type optical recording alloy is formed on an insulating substrate. Information is erased from the alloy film by heating it with an expedient other than a laser beam. Information is read by sensing reflected light of light projected on the alloy film.

16 Claims, 9 Drawing Sheets

OPTICAL INFORMATION RECORDING DEVICE

FIELD OF THE INVENTION

The present invention relates to an optical information storage device which stores information by optical means, and more particularly to an optical information storage device which can record, reproduce and erase information.

BACKGROUND OF THE INVENTION

In recent years, as information recording has been raised in density and digitized, the developments of various information recording/reproducing systems have been carried forward. In particular, optical discs which utilize the light energies of lasers for recording, erasing and reproducing information are capable of higher recording densities as compared with magnetic discs, and they are promising systems for future information recording. Among them, the reproducing device utilizing the laser has been put into practical use as a compact disc (CD). On the other hand, the systems capable of recording are broadly classified into two types; the add-on type and the rewritable type. The former can write information only once and cannot erase it. The latter is a system capable of repeated writing and erasing. The recording method of the add-on type is such that the recording part of a medium is destroyed or molded into a rugged part by laser light, and the reproduction makes use of the change of the amount of light reflection based on the interference of laser light at the rugged part. It is generally known that Te or an alloy thereof is utilized for the recording medium so as to form the rugged part through the fusion or sublimation of the material. The medium of this sort involves some problems such as toxicity. As the recording media of the rewritable type, optomagnetic materials form the mainstream. With this method, information is recorded in such a way that the local magnetic anisotropy of the medium is inverted at or near the temperature of the Curie point or compensation point thereof by utilizing light energy, and it is reproduced owing to the magnitude of rotation of a polarization plane based on the magnetic Faraday effect and magnetic Kerr effect of polarization input light at the corresponding part. As the most promising method for rewritability, this method is being energetically studied and developed with the aim at practical use several years hence. Another system of the rewritable type exploits the change of a reflection rate based on the reversible phase change between the amorphous state and the crystalline state of a recording medium. An example of the recording medium is made of an amorphous - crystalline phase transformation type material in which $TeO_x$ is doped with small amounts of Ge and Sn as described in 'National Technical Report', Vol. 29, No. 5 (1983).

With this system, however, the crystallization temperature of the amorphous phase is low, so that the phase of the material is unstable at the normal temperature.

Meanwhile, a method wherein a recorded content is erased by causing direct current to flow through a recording medium is disclosed in, for example, Japanese Patent Application Laid-open No. 59-79436 entitled 'Information recording, reproducing and erasing method' laid open on May 8, 1984. This method consists in that direct current is caused to flow through an electrochromic material such as $WO_3$ in contact therewith, whereby a recorded content is erased. It has the disadvantage that a recorded content disappears naturally with the lapse of time.

SUMMARY OF THE INVENTION

An object of the present invention is to provide an optical information recording device which can stably hold a content recorded on an optical recording layer and which can readily erase the recorded content for the purpose of rewriting.

As understood by reference to the ensuing description, the present invention employs a crystal - crystal phase transformation type optical recording alloy for an optical recording layer and heats at least a part of the alloy with an expedient other than laser light, thereby to erase recording.

DETAILED DESCRIPTION OF THE PREFERRED EMBODIMENTS

As an alloy whose color tone change is utilized, there is an optical recording alloy invented by the inventors, which has the phase transformation between crystals exploited.

In an alloy which has different crystal structures at a first temperature (high temperature) higher than the room temperature and at a second temperature (low temperature) lower than the first temperature in a solid state, the optical recording alloy is a recording material characterized in that the alloy has an alloy composition according to which when quenched from the aforementioned high temperature, at least a part of the surface of the alloy forms a crystal structure different from the non-quenched crystal structure at the aforementioned low temperature.

This alloy has at least two sorts of spectral reflection rates at an identical temperature and can reversibly change the spectral reflection rates through a heating and cooling process in the solid phase state thereof.

That is, the alloy according to the present invention has phases of different crystal structures in at least two temperature regions in the solid phase state, a state obtained by quenching the high temperature one of the phases and the low temperature phase state being a non-quenched standard state have unequal spectral reflection rates, and the spectral reflection rates are reversibly changed by heating and quenching in the temperature region of the high temperature phase and heating and cooling in the temperature region of the low temperature phase.

Figure 1:
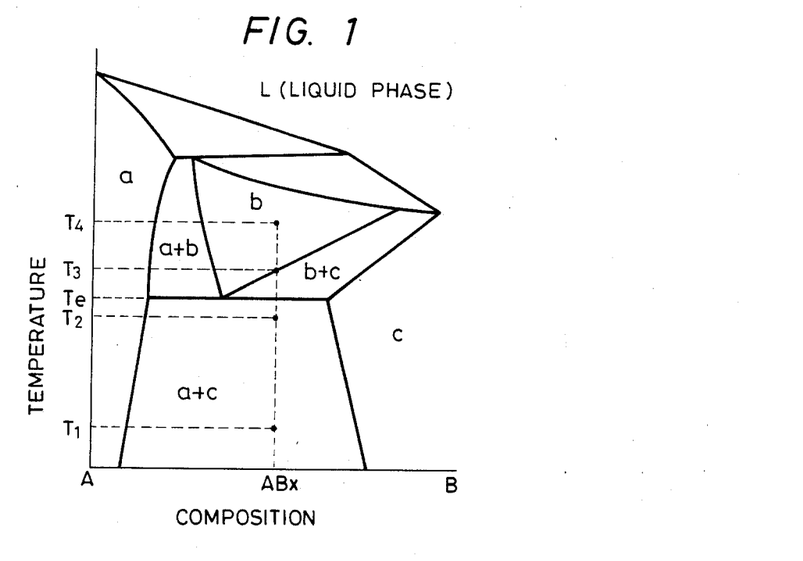
FIG. 1 is a state diagram of an optical recording alloy for use in the pressent invention.

As regards the reversible change of the reflection rates of the optical recording alloy, the principle will be described with reference to FIG. 1. The figure is a state diagram of an X - Y binary alloy, in which a solid solution a and intermetallic compounds b and c exist. When an alloy of a composition $AB_x$ is taken as an example, it has the single phase b, a phase (b+c) and a phase (a+c) in the solid phase state. The respective single-phase states a, b and c have different crystal structures, and these individual phases and the mixed phases thereof are respectively different in an optical property, for example, the spectral reflection rate. In case of such an alloy, the phase (a+c) is stable at a temperature $T_1$ which is generally the room temperature. When it is heated up to a temperature $T_4$ and is quenched, the phase b rapidly cools down to the temperature $T_1$. This phase b may well be transformed into a new phase (for example, b') during the rapid cooling. Since this state differs from the phase (a+c), also the spectral reflection rate becomes different. When the quenched phase-b (or phase-b') alloy is heated up to a temperature $T_2$ below an erasing temperature $T_e$ and is cooled, it is transformed into the phase (a+c), and the spectral reflection rate returns into the original magnitude. By repeating such two heating-and-cooling processes, the spectral reflection rates can be reversibly changed.

(Alloy Composition)

The optical recording alloy must have different crystal structures in high temperature and low temperature states, and the quenched crystal structure thereof must be formed by quenching from a high temperature. Further, the phase formed by the quenching must be changed into the crystal structure in the low temperature state by heating at a predetermined temperature. A value of at least $10^{2°}$ C./second or at least $10^{3°}$ C./second is preferable as a cooling rate for obtaining the crystal structure different from that at the low temperature by means of the quenching from the high temperature in this manner.

The optical recording alloy should preferably be an alloy which is composed of at least one of the group-Ib elements of the periodic table and at least one element selected from among the group-IIb, group-IIIb, group-IVb and group-Vb elements. Among such alloys, alloys whose principal components are copper and which contain Al, Ga, In, Ge and Sn are favorable, and these alloys which further contain Ni, Mn, Fe and Cr as third elements are favorable.

Also, alloys whose principal components are silver and which contain Al, Cd and Zn are favorable, and these alloys which further contain Cu, Al and Au as third elements are favorable.

An alloy whose principal component is gold and which contains Al is favorable.

The alloy of the present invention should preferably have an intermetallic compound which consists of the group-Ib element and the group-IIb, group-IIIb, group-IVb or group-Vb element mentioned above.

(Non-bulky Material and Method of Producing the Same)

In order to attain the variability of a reflection rate, the optical recording alloy needs to form an overcooled phase through the heating and quenching of the material. A non-bulky material of small heat capacity which exhibits rapid heating and rapid cooling effects is desirable for preparing and storing information at high speed. More specifically, desirable is a non-bulky material having a volume with which substantially only a part of desired area can be changed into a crystal structure different from a reference crystal structure over the whole depth thereof by energy thrown into the desired minute area. Thus, a foil, a film, fine wire, powder or the like which is the non-bulky material of small heat capacity is desirable for preparing a high density of information with desired minute areas. A film thickness of 0.01–0.2 μm is recommended for the preparation of information with minute areas which realize a recording density of or above 20 megabits/cm². In general, an intermetallic compound is difficult of plastic working. As a technique for producing the foil, film, fine wire or powder, accordingly, it is effective that the material is quenched and solidified directly from a vapor phase or liquid phase into a predetermined shape. Such methods are PVD (such as evaporation or sputtering), CVD, a molten metal quenching method wherein a molten metal is poured onto the peripheral surface of a member of high thermal conductivity rotating at high speed, especially a metal roll and is thus quenched and solidified, electroplating, chemical plating, etc. In case of utilizing the film or the powdery material, it is effective to directly form it on a substrate or to bond it on a substrate by coating. When the coating is employed, a binder which does not cause a reaction etc. even by the heating of the powder is favorable. It is also effective for preventing the oxidation etc. of the material due to heating that the surface of the material or the surface of the film or coating layer formed on the substrate is coated.

The foil or the fine wire should preferably be formed by the molten metal quenching method, and should preferably have a thickness or diameter not greater than 0.1 mm. Especially for manufacturing a foil or fine wire of a crystal grain size not greater than 0.1 μm, a thickness or diameter not greater than 0.05 mm is favorable.

The powder should preferably be formed by an atomizing method wherein a molten metal is sprayed together with a gaseous or liquid coolant and is thrown into water so as to be quenched. The powder should preferably have a grain size not greater than 0.1 mm, and particularly an ultrafine powder having a grain size not greater than 1 μm is favorable.

As stated before, the film can be formed by evaporation, sputtering, CVD, electroplating, chemical plating, or the like. In particular, the sputtering is favorable for forming a film whose thickness is at most 0.1 μm. The sputtering can easily control an alloy composition aimed at.

(Structure)

The optical recording alloy must have different crystal structures at a high temperature and a low temperature, and have a composition of an overcooled phase according to which the crystal structure at the high temperature is held at the low temperature by quenching from the high temperature. Favorable is an intermetallic compound which has a crystal structure of disordered lattice at the high temperature but whose overcooled phase has an ordered lattice of the Cs-Cl type or the DO$_3$ type by way of example. As a material which can greatly change an optical property, the alloy of the present invention should preferably be an alloy which principally forms this intermetallic compound, and especially a composition with which the whole alloy forms the intermetallic compound is favorable. The intermetallic compound is called an electron compound, and especially a material near the alloy composition of a 3/2 electron compound (the average outer-shell electron density e/a of which is 3/2) is favorable.

Besides, the optical recording alloy should preferably have an alloy composition exhibiting a solid phase transformation, for example, eutectoid transformation or peritectoid transformation, and the alloy of the composition affords a great difference of spectral reflection rates through quenching and non-quenching from the high temeprature.

The optical recording alloy should preferably be an alloy having ultrafine crystal grains, and especially a crystal grain size not greater than 0.1 μm is favorable. That is, crystal grains should preferably be smaller than the values of the wavelengths of the visible radiation region and may well be smaller than the value of the wavelength of a semiconductor laser radiation.

(Characteristics)

The recording material of the optical recording can form at least two sorts of spectral reflection rates in the visible radiation region at an identical temperature. That is, the spectral reflection rate of a state having the crystal structure formed by the quenching from the high temperature needs to differ from that of a state having the crystal structure formed by the non-quenching.

The difference of the spectral reflection rates to be attained by the quenching and the non-quenching should preferably be at least 5%, particularly at least 10%. When the difference of the spectral reflection rates is great, the discrimination of colors by vision is easy, which is remarkably effective in various applications to be described later.

As a radiation source for spectral reflection, an electromagnetic wave is usable even when it is other than the visible light, and infrared radiation, ultraviolet radiation, etc. are also usable.

As the other characteristics of the optical recording alloy, the electric resistivity, the refractive index of light, the polarization factor of light, the permeability rate of light, etc. can be reversibly changed likewise to the spectral reflection rate, and they can be utilized for recording various information and reproducing recorded information.

Since the spectral reflection rate relates to the surface roughness state of the alloy, at least a desired part should preferably be a specular surface so as to afford the difference of or above 10% in at least the visible radiation region as described before.

The optical recording alloy changes physical or electrical characteristics, such as a spectral reflection rate for an electromagnetic wave, an electric resistivity, a refractive index, a polarization factor and a permeability rate, partially or wholly on the basis of the change of crystal structures owing to heating and quenching, and it can be used for an information recording device by exploiting the changes of these characteristics.

As means for recording information, electric energies in the forms of a voltage and current or electromagnetic waves (visible light radiant heat, infrared radiation, ultraviolet radiation, light from a photographic flash lamp, an electron beam, a proton beam, a laser beam from an argon laser, a semiconductor laser or the like, high-voltage spark discharge, etc.) can be employed, and it is particularly favorable that the alloy is applied to an optical recording medium by utilizing the change of spectral reflection rates based on the projection of any of the means. The optical recording alloy can be used in disc devices of the reproduce-only type, the add-on type and the rewrite type by applying it to the recording media of the corresponding optical discs, and especially, it is very effective in the rewrite type disc device. A recording method may be either a method which applies energy intermittently in pulsing fashion, or a method which applies energy continuously. With the former, information can be recorded as digital signals.

Examples of the principles of recording and reproduction in the case of using the optical recording alloy for the recording medium of an optical disc are as follows. First, the recording medium is locally heated, and by quenching after the heating, a crystal structure in a high temperature region is held in a low temperature region, thereby to record predetermined information. Alternatively, the high temperature phase on which the operation is based is locally heated to locally record in the high temperature phase by virtue of the low temperature phase. Light is projected on a recorded area, and the difference of the optical property values of a heated part and an unheated part is detected, whereby information can be reproduced. Further, a part recorded as information is heated to a temperature lower than the heating temperature of the recording operation, whereby the recorded information can be erased. When the light is a laser beam, a laser of short wavelength is preferable. Since the difference of the reflection rates of the heated part and the unheated part in the present invention is great at a wavelength of or near 500 nm or 800 nm, laser light having such a wavelength should preferably be used for the reproduction. The same laser source is used for the recording and for the reproduction, and different laser light the energy density of which is lower than that of the recording laser light is projected for the erasing. Current energy heating to be described later is favorable for erasing information in a laser region.

In addition, the disc which employs the optical recording alloy for the recording medium has the great merit that whether or not information is recorded can be discriminated by vision.

Figure 2A:
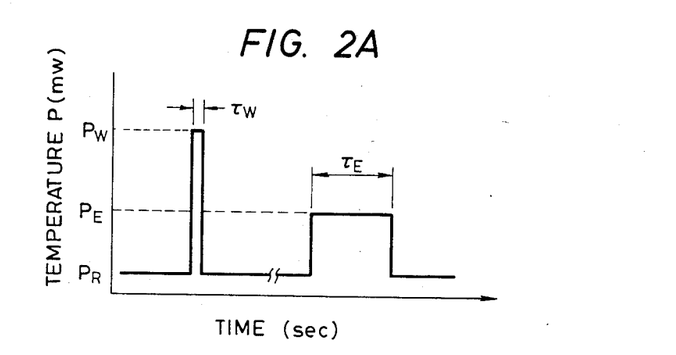
FIGS. 2A and 2B are diagrams for explaining input heat energy to the optical recording alloy for use in the present invention.
Figure 2B:
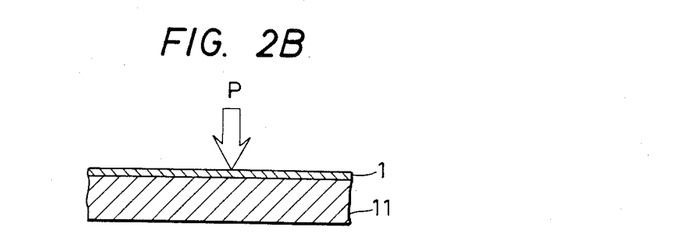

The optical recording alloy is formed into the state of a thin film 1 on a substrate 11 as shown in FIG. 2B.

Figure 3A:
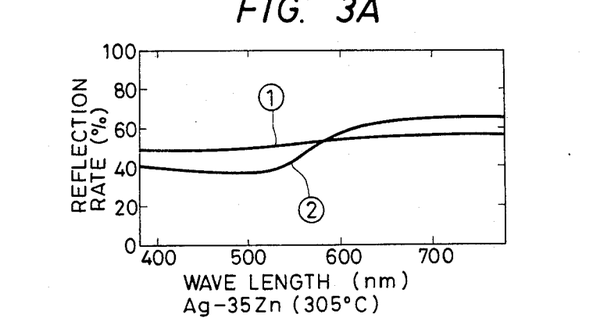
FIGS. 3A to 3C are diagrams of the spectral reflection characteristics of optical recording alloys.
Figure 3B:
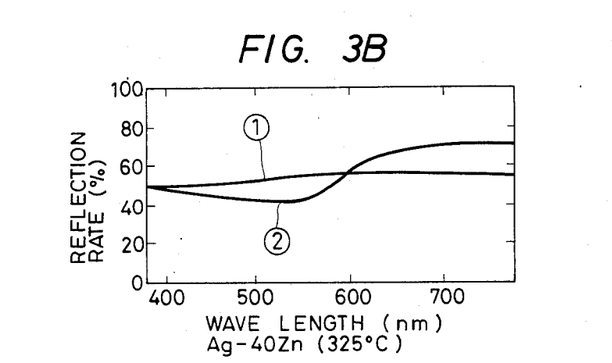
Figure 3C:
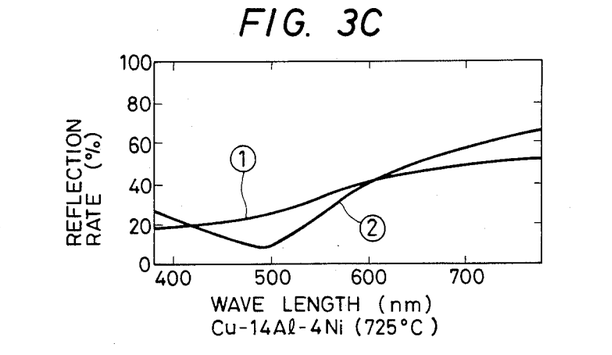

When given high heat energy for a moment as indicated by a pulse width $\tau_W$ in FIG. 2A, the alloy is transformed into the second phase, so that the reflection rate thereof changes from ① to ② as shown in any of FIGS. 3A to 3C. Subsequently, when the alloy is given low heat energy of comparatively long duration having a pulse width $\tau_E$ as shown in FIG. 2A, it is reversibly transformed into the first phase, and the reflection rate changes from ② to ① at this time. The reflection rate change can be sensed by a well-known optical head device by which a light beam of low heat energy $P_R$ indicated in FIG. 2A and not contributive to the phase transformation is projected as a spot on the alloy material 1 and which electrically detects the resulting reflected light. With the optical head, the second temperature profile which affords the short time and high heat profile required for causing the phase change into the second phase is allotted as light energy for writing, the first temperature profile which affords a profile longer in time and lower in heat than the second temperature profile and which causes the change into the first phase is allotted as light energy for erasing, and the temperature profile which is based on the projection of the heat energy not directly contributing to the phase change is allotted as light energy for reading.

In FIG. 2A, $P_W$ denotes input heat for writing, $P_E$ input heat for erasing a stored content, and $P_R$ laser input heat for reading.

As the recording characteristic of the phase transformation type optical recording alloy according to the present invention, it has been revealed that writing is possible with a pulse width on the order of 0.1 $\mu$s. When compared with the prior-art systems, the optical information recording device of the present invention has the features (1) that it is capable of rewriting unlike the conventional pit system incapable of rewriting, and (2) that it has a recording lifetime longer than that of the amorphous - crystal state transformation type having the rewriting function, described in 'National Technical Report', Vol 29, No. 5 (1983) mentioned before. Further, (3) as compared with the electrochromic material having the rewriting function, disclosed in Japanese Patent Application Laid-open No. 59-79436 mentioned before, the optical recording alloy of the invention is characterized in that recorded contents can be stably held, that both an erasing method employing A. C. and an erasing method employing D. C. are possible, and that a head is usable, not only in contacting fashion, but also in noncontacting fashion. Accordingly, the alloy is promising as a high-density recording material.

As compared with the materials in the prior arts, the phase transformation type optical recording alloy is higher in the mechanical strength and larger in the rate of elongation and is therefore richer in flexibility. This is convenient especially in case of using the alloy in its form evaporated or sputtered on a thin disc, tape, card etc. Information recording and erasing systems for such various information carriers need to be determined from the required quantity of information, the image of a device, etc., and especially, systems based on the characteristics of materials need to be adopted. In this respect, the optical recording alloy has a high thermal conductivity. In a recording mode, therefore, it is effective that a pulse of short duration and high heat energy is thrown to record information in a minute area, whereby high-speed writing can be achieved.

In an erasing mode, when the light energy of the pulse width $\tau_E$ shown in FIG. 2A is thrown by a hitherto-used semiconductor laser having an oscillation wavelength of 830 nm, the reflection rate decreases from the recorded state ② into the erased state ①. Since the amount of input heat optical recording a film 1 increases at this moment, rewriting is feared when the temperature is raised to the second temperature profile. Therefore, the erasing method employing such light energy is not always optimal. In this connection, with an Ar+ laser whose wavelength is near 458 nm, the reflection rate increases when the recorded state ② changes into the erased state ①, and hence, the above problem is inevitable. However, the Ar+ laser is larger in size and higher in price than the semiconductor laser and is more disadvantageous in point of device implementation.

The present invention has been made in view of this drawback, and consists in that the erased state is attained by causing current to flow through the optical recording alloy and utilizing the generated heat energy. Methods for causing the current to flow need to be properly selected according to the respective information carriers, and the principles thereof will be described with reference to FIG. 4A et seq.

Figure 4A:
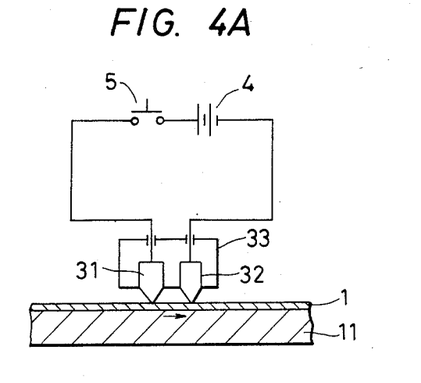
FIGS. 4A to 4C are diagrams for explaining principles for heating the optical recording alloy.

In FIG. 4A, the probes 31 and 32 of a current probe type head 33 are held in contact with an information recording carrier in which an optical recording alloy 1 put into a thin film is formed on an insulating substrate 11, electric energy from a power source 4 is supplied to a part of the optical recording alloy 1 through switch means 5, and the optical recording alloy is caused to generate heat by the Joule heat arising in this region. Since the resistivity of the alloy is $10^{-5}$–$10^{-6}\Omega\cdot$cm, the resistance R of the alloy between electrodes each having a thickness of 0.1 $\mu$m, a width of 1 $\mu$m and a length of 1 $\mu$m becomes:

$$R = \rho \cdot \frac{l}{S} = (10^{-5} - 10^{-6}) \times \frac{10^{-4}}{10^{-5} \times 10^{-4}} = 0.1 - 1\ (\Omega) \quad (1)$$

In order to heat this resistance to 150° C. which is the temperature of transformation from the second phase to the first phase (erasing temeprature ) of the optical recording alloy, an electric power of about 3 mW is required on experimental basis. Therefore, the required current I becomes:

$$I = \left(\frac{3 \times 10^{-3}}{0.1 - 1}\right)^{\frac{1}{2}} = 0.173 - 0.055\ (A) \quad (2)$$

Figure 4B:
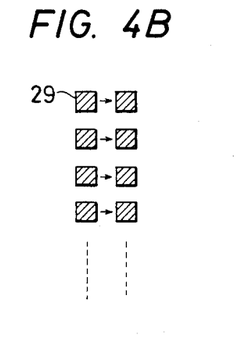
Figure 4C:
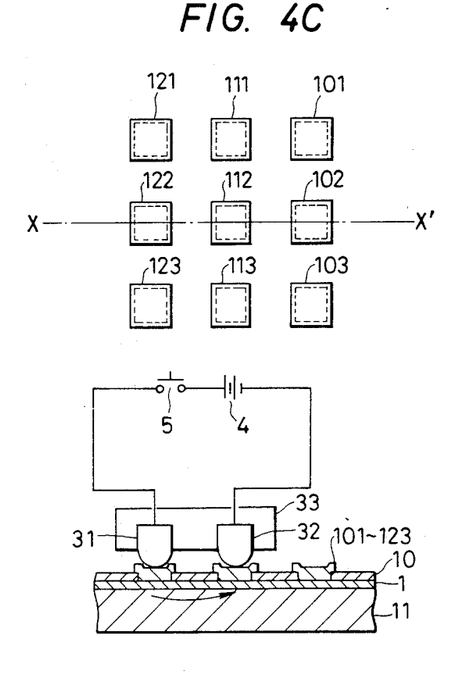

In the actual disc, the value of this current I needs to be considerably enlarged in consideration of the diffusion of heat into the substrate. A multiple probe 29 as shown in FIG. 4B is effective for increasing the amount of information to be processed. In addition, as shown in FIG. 4C, the actual information recording carrier can be formed on its surface with a protective film 10 having an excellent wear resistance and being transparent, and a plurality of conductive films 101-123 arrayed. Since, in this case, a recording region for information is restricted by the pitch of the conductive films or electrodes 101-123, they are processed to the order of $\mu$m by microscopic processing such as photolithography. This structure is well suited as the example in which the optical recording alloy is deposited on a card.

Figure 5:
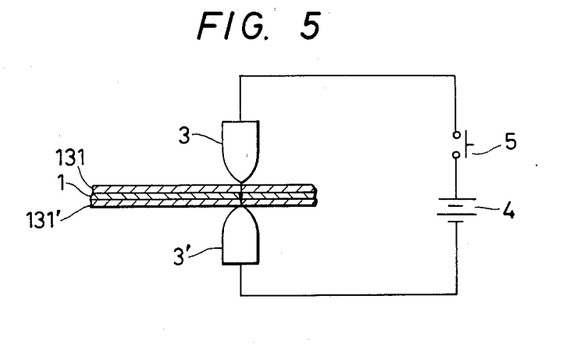
FIGS. 5 and 6 are diagrams of other embodiments of the heating method for the optical recording alloy.

FIG. 5 shows a structure wherein an optical recording alloy 1 is coated with conductive protective films 131 and 31' which are transparent, and current is passed in the thickness direction of the alloy by probes 3 and 3' which are held in contact with the upper and lower surfaces of alloy, thereby to generate heat. The optical recording carrier of such a structure can have its entire thickness made as very small as the order of microns, and can therefore realize an optical recording alloy tape. With such a method, the optical recording alloy 1 can be caused to generate heat so as to effect the foregoing transformation between the first phase and the second phase.

Figure 6:
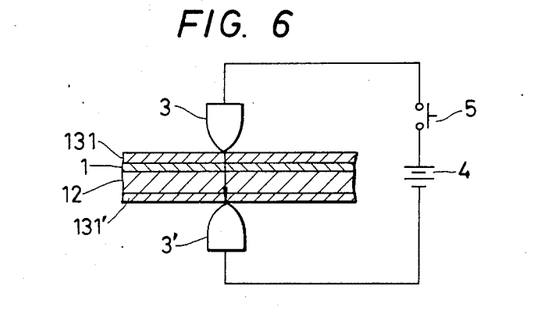

FIG. 6 shows a structure wherein an optical recording alloy 1 is formed on a reinforcement member 12. The reinforcement member 12 is made of a material higher in resistivity than the optical recording alloy 1 so as to function also as a heating member. The material should preferably be a nichrome-based material which is a general heating resistance material. Transparent conductive members 131 and 131' are deposited at upper and lower surfaces with which probes 3 and 3' are held in contact, and they enhance the durability of the optical recording alloy tape. The total thickness of the constituents needs to be designed between 1 μm and 10 μm considering, not only the strength, but also the required current, voltage, heat generation efficiency, etc.

Figure 7:
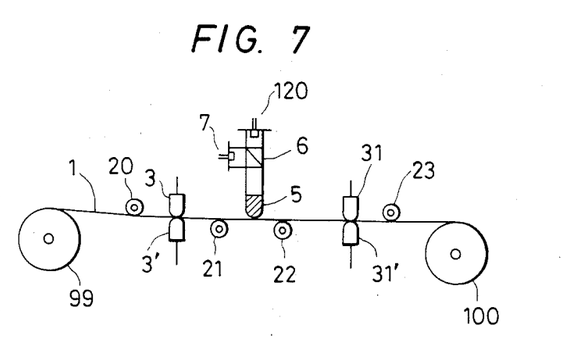
FIG. 7 is a view of an embodiment of an optical recording tape recorder which uses an optical recording alloy.

FIG. 7 is a schematic view of the whole system for the writing, reading and erasing of an optical recording alloy tape. Rollers 20, 21, 22 and 23 are disposed in order to bestow a sufficient tension on the tape 1 extended between two reels 99 and 100. Recording probes 3 and 3' cause current to flow across the upper and lower surfaces of the tape, to endow an optical recording alloy formed in the tape with heat energy necessary for the phase transformation thereof. Since the optical recording alloy 1 of the tape has its reflection rate increased by way of example in accordance with a given temperature profile, the increase of the reflection rate is sensed as a voltage signal change by a reading system which consists of a light source 7, a beam splitter 6, an objective 5 and a photodiode 120. The material of the objective 5 is a transparent and wear-proof material (for example, any of gems), and the dimensions thereof including a focal distance etc. are adjusted beforehand so that when the front end part thereof depresses the tape 1, the beam spot of the optical system may be fined. Symbols 31 and 31' denote erasing probes. If necessary, they afford lower heat energy for a longer time as compared with the recording probes 3 and 3', thereby to transform the optical recording alloy 1 into the first phase and lower the reflection rate thereof so as to erase information. The detailed functions of the information reading system will become clearer from embodiments to be described later.

Figure 8A:
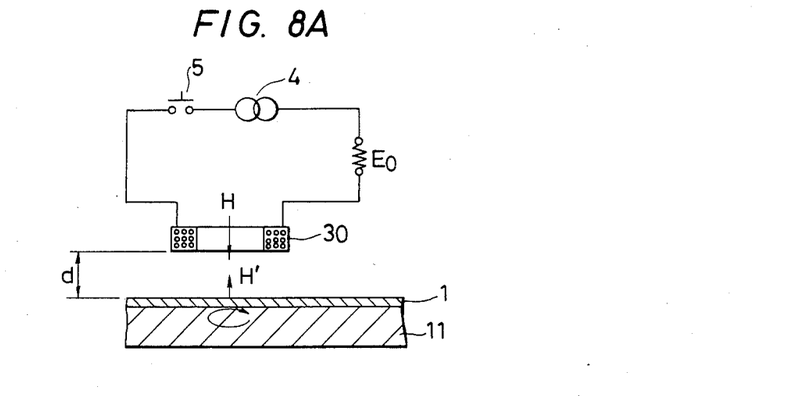
FIGS. 8A and 8B are views for explaining a principle for heating an optical recording alloy with eddy current.
Figure 8B:
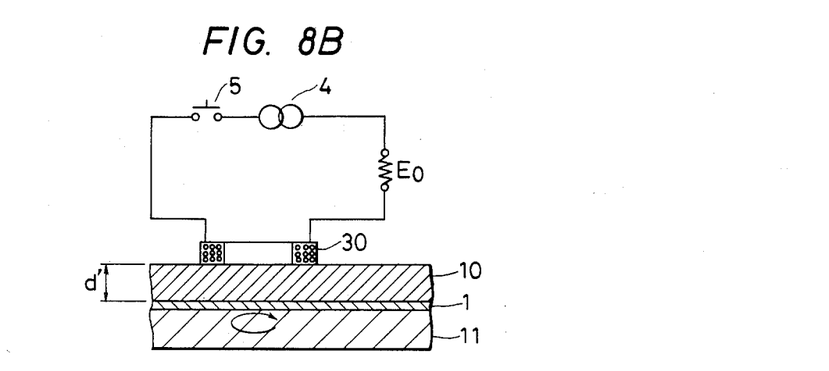

FIGS. 8A and 8B elucidate a measure in which an eddy current is caused to flow through an optical recording alloy, to generate the Joule heat and to establish a temperature profile for inducing the phase transformation between the first phase and the second phase of the alloy.

When a high frequency current on the order of $10^3$–$10^6$ Hz is caused to flow from a high frequency oscillator 4 to a coil 30 and an alloy film 1 is perpendicularly approached to a magnetic flux H generated by the coil, eddy currents are concentrically produced in the alloy film.

Since the magnitude of the eddy current depends upon the distance d between the coil 30 and the alloy film 1, this distance needs to be held constant at all times. FIG. 8B shows a method for realizing the constant distance. A transparent insulating film 10 having a thickness d' is formed between the coil 30 and the alloy film 1, and the lower end of the coil 30 is always held in touch with the surface of the film 10. Therefore, the distance between the two is always held at d', and the eddy current of fixed magnitude flows in the alloy film 1 at all times, so that a predetermined temperature profile can be reproducibly attained. While, in this example, the insulating film 10 is disposed on the alloy film 1, a spacer having a thickness d' may well be disposed between the two elements 1 and 30 in the case of the application to the optical alloy tape stated before.

Figure 9:
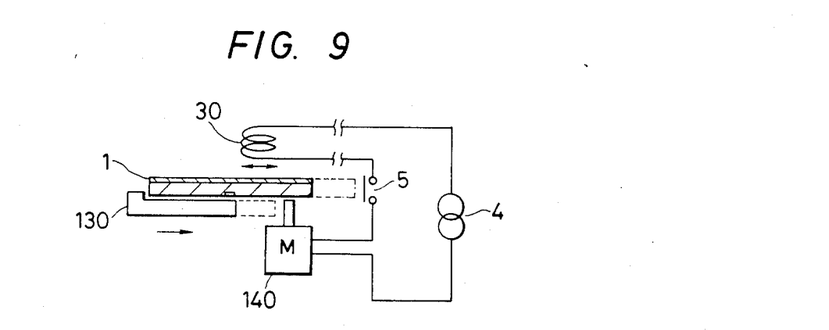
FIG. 9 is a view of an embodiment of a recorded information eraser of the eddy current heating type.

FIG. 9 exemplifies a device wherein an optical recording alloy 1 is constructed as a disc image, it is transported onto a motor 140 by a moving holder 130, and while moving the disc, a coil 30 is moved in the radial direction thereof, to induce an eddy current in the alloy 1, whereby recorded information is erased by generated heat. This device can be fabricated compactly and at low cost as an information eraser. Besides, when the data processing system of the eraser is unified with that of the prior-art optical writer and reader of the pit system (write-once type), an erasable type optical recording device employing the optical recording alloy is realized merely by adding only this eraser.

Figure 10:
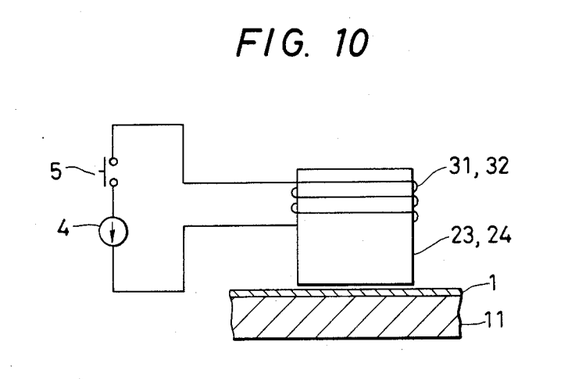
FIG. 10 is a view of an embodiment of a recorded information eraser which employs thermal capacity members.
Figure 11:
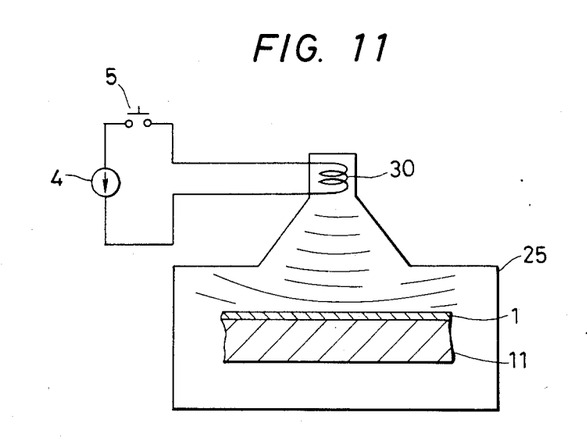
FIG. 11 is a view of an embodiment of a recorded information eraser which employs a microwave oven.

A dedicated appliance which merely erases recorded information is as shown in FIG. 10 in which thermal capacity members 23 and 24 held at a predetermined temperature beforehand and having current probes 31 and 32 respectively wound thereon are held in contact with an optical recording alloy 1, whereby a predetermined temperature profile can be attained. It is also possible to utilize a device as shown in FIG. 11 in which an optical recording alloy 1 is set in an oven 25, and a high frequency coil 30 transmits a microwave to induce current in the optical recording alloy 1 and to attain a predetermined temperature profile in interlocking with a switch, a timer or the like 5. Alternatively, it is possible to utilize a device in which an insulator (dielectric) serving as a substrate is subjected to dielectric heating with a microwave. These erasers can be fabricated very simply and at low cost.

Figure 12:
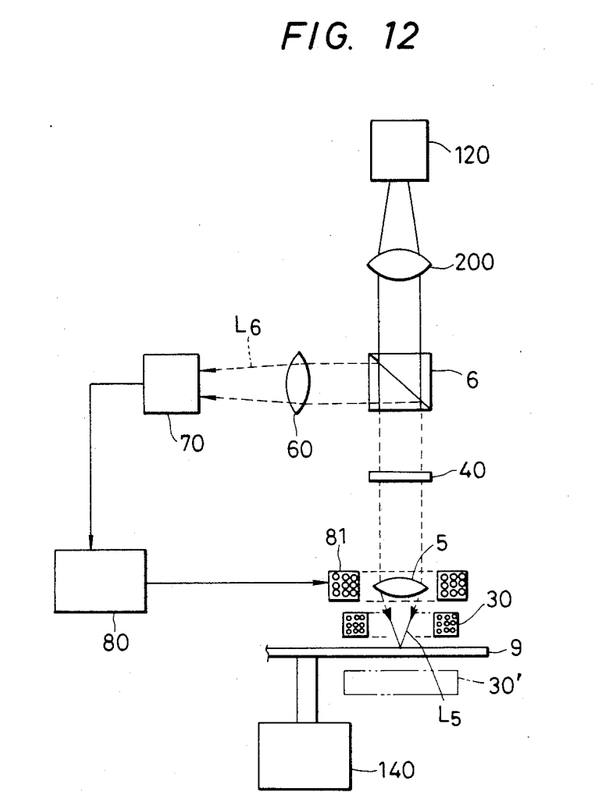
FIG. 12 is a view of an embodiment of an optical recording head which has an erasing function owing to a radiofrequency heating coil.

Next, FIG. 12 shows the general arrangement of an optical head for an optical recording alloy disc which has writing, reading and erasing functions.

Figure 13:
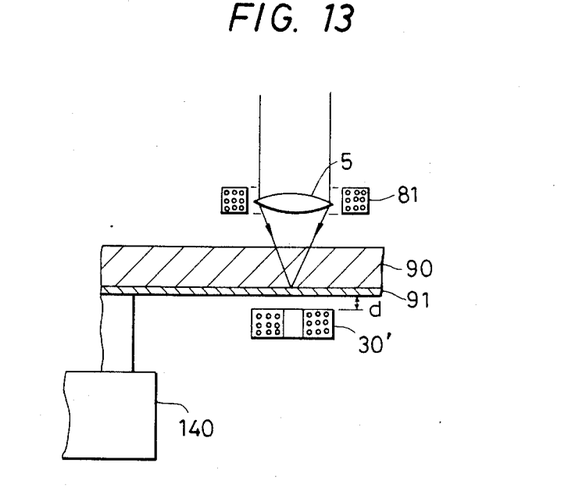
FIG. 13 is a view of an embodiment in which an erasing head in the arrangement of FIG. 12 is disposed under an optical recording alloy film.

The symbols and operations of various portions in the figure will now be described. Numeral 120 designates a laser diode which serves as a light source. Numeral 200 designates a collimation lens, which turns the light beam of the laser diode 120 into a collimated beam. Shown at numeral 6 is a polarizing beam splitter (hereinbelow, abbreviated to 'PBS'), which transmits the output beam of the collimation lens therethrough and which refracts retrogressive light from a λ/4 plate indicated by numeral 40 to be stated next. The λ/4 plate 40 is used for the phase polarization of light in order to facilitate the discrimination between the input light and reflected light in the PBS 6. Numeral 5 indicates an objective, which is used for condensing input light. Numeral 60 indicates a coupling lens, which receives a beam from the PBS 6 and condenses it. The coupling lens 60 is composed of two semicylindrical lenses which are crossed. Shown at numeral 70 is a photosensor. The photosensor 70 senses the shape of the light spot of input light L6 from the coupling lens 60, thereby to indirectly sense the shape of the light spot of output light L5 from the objective 5. Numeral 80 denotes an actuator, which adjusts the focal position of the output light L5 of the objective 5 in accordance with the output of the photosensor 70. Shown at numeral 81 is a lens driving unit, which adjusts the position of the objective 5 in accordance with a drive control output from the actuator 80. Numeral 9 denotes a disc which can optically record, reproduce and erase information by way of example and which is partly illustrated. The disc 9 is capable of the recording and erasing in such a way that the output light L5 from the objective 5 projects a desired light spot on the surface of the disc. Numeral 140 denotes a motor, by which the disc 9 is driven. Numeral 30 indicates a high frequency coil which is installed in proximity to the disc 9, and which induces eddy currents in an optical recording alloy film formed at the surface of the disc 9, to give a comparatively large region the predetermined temperature profile described before and to erase recorded information. Symbol 30' denotes a high frequency coil which has the same function as that of the high frequency coil 30, and which is an example of installation in the case where heating from the rear surface of the disc 9 is more convenient. This example has a detailed diagram shown in the next FIG. 13. More specifically, the disc 9 is formed with an optical recording alloy film 91 on the lower side in order to prevent the surface thereof from being affected by dust and dirt. As regards the recording and reproduction, a light beam having passed through a transparent substrate 90 from above is focused on the alloy film 91, to write information with the maximum energy density and to read information with an enhnaced resolution. Meanwhile, in erasing information, the projection of light at a lower temperature and for a longer time as compared with the temperature profile of the writing mode is required as stated before. As a method for achieving the requirement, there have been proposed methods of expanding a light beam, e.g., a method wherein an elliptic beam longer in the track direction of the disc 9 is projected and a method wherein a plurality of beam spots are prepared using an AO modulator. However, they cannot be said the optimum methods for the information carrier employing the optical recording alloy. The reason is that a single optical system is difficult of sufficiently expanding a light beam in the erasing mode, in contradiction to focusing the light beam to the limit as required in the writing and reading modes. In this regard, as illustrated in FIG. 13, the high frequency coil 30' is held in proximity to the optical recording alloy film 91 and generates the eddy currents in the alloy film, whereby a uniform desired temperature profile can be established in a comparatively large region. Therefore, even when the disc 9 is rotating at high speed, a desired information region can be heated for a long time, and information can be erased perfectly. Of course, in case of erasing information in a small region, a mode is also possible in which, as in the prior art, a light beam projected from above the disc 9 is enlarged to perform heating at a lower temperature and for a longer time as compred with that of the writing operation and to erase the local information.

Figure 14:
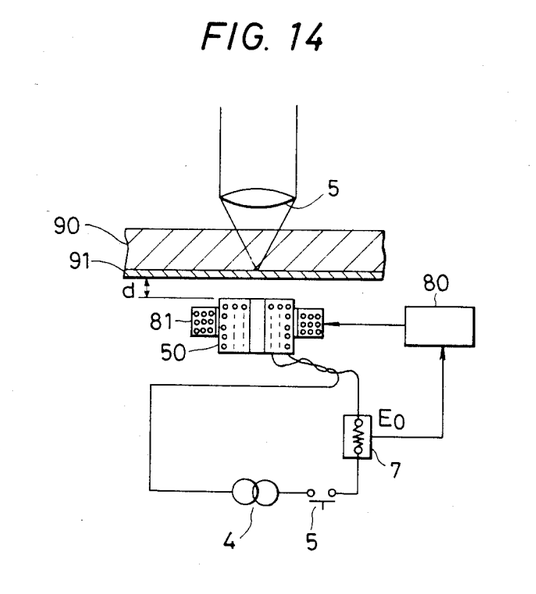
FIG. 14 is a view of an embodiment of the erasing radiofrequency heating coil which has a position controlling function.

FIG. 14 shows an example in which an erasing coil 50 includes the sensor function of detecting the gap d between it and an optical recording alloy 91, and a force motor 81 for holding the distance d constant by the use of the detected signal is comprised. That is, since a voltage $E_O$ dependent upon the gap d is induced in the coil 50, it is amplified by an actuator 80 and then fed back to the force motor 81, whereby the gap between the coil 50 and the optical alloy film 91 is always held at a desired value. Therefore, a temperature profile can be reproducibly generated in the alloy film 91. The high frequency coil 50 can also be constructed of two separate coils for detecting a displacement and for heating the alloy film. The frequencies of electric quantities for the writing, reading and erasing of information should desirably be set at unequal values from the viewpoint of lessening influences on the other modes.

Figure 15A:
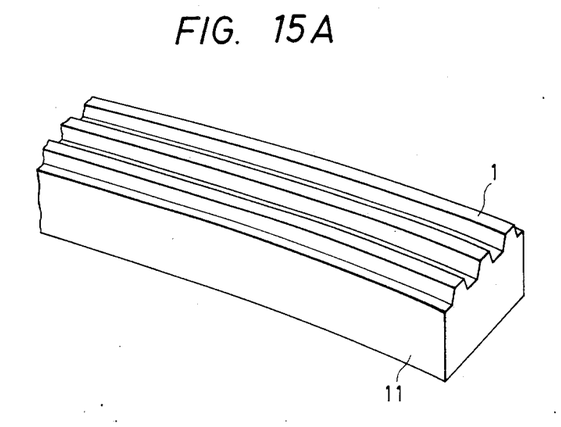
FIGS. 15A and 15B are views each showing an embodiment of an optical recording alloy-information carrier which has a discrete structure.
Figure 15B:
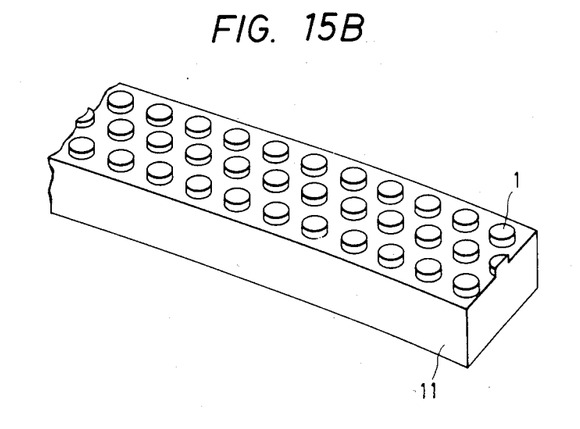

FIGS. 15A and 15B show examples in each of which parts of an optical recording alloy film 1 are discretely formed on a substrate 11. This measure serves to prevent crosstalks with adjacent information items. Besides, in the case where an eddy current is caused to flow in an alloy film by a high frequency coil, no current flows outside the corresponding region, and hence, only the information of this region can be perfectly erased. This structure may well be fabricated in such a way that an optical recording alloy film is deposited on a substrate by evaporation or sputtering, whereupon it is microscopically processed by utilizing a photolithographic process. However, when an alloy film is deposited after pressing the corresponding pattern on a substrate by means of a stamper beforehand, the alloy film does not adhere on the side surfaces of convex and concave parts because of the small thickness thereof, and the upper surfaces of the protrusions and the other regions are insulated, so that the same discrete structure as in the above can be realized.

An optical alloy type information recording device which adopts the present invention can realize writing, reading and erasing functions. Especially, it can provide a device which perfectly erases written information, with a simple structure and economically.

By utilizing the present invention, it is possible to provide, not only an information recording device for an optical disc, but also information recording devices for a rewritable optical tape and optical card made of an optical alloy.

What we claim is:

1. An optical information recording device wherein an optical recording layer formed on an insulating substrate is subjected to a change in any of optical characteristics such as reflection, transmission and absorption of light so as to optically write information, characterized in a crystal - crystal phase transformation type optical recording alloy for recording information thereon, and that means to apply current to the alloy film partly or wholly is provided for at least erasing of the information recorded on said alloy film, said applying means subjecting said alloy film to a thermal hysteresis so as to afford a phase transformation to a crystal state of said alloy film, and that optical characteristic sensing means to detect the phase transformation as an information change is provided, the crystal phase state being sensed as information of a written or erased state by said sensing means.

2. An optical information recording device as defined in claim 1, wherein said applying means includes at least two electrodes which are held in contact with parts of said alloy film and which cause the current to flow to a part of said alloy film, thereby to heat and cool said alloy film and to write and erase information in said alloy film.

3. An optical information recording device as defined in claim 2, wherein said alloy film constitutes an optical recording alloy tape together with transparent conductive films which are formed on an upper surface and a lower surface thereof, and a plurality of current probes for writing and erasing information are formed in contact with said conductive films.

4. An optical information recording device as defined in claim 1, wherein said applying means includes a coil which lies in proximity to a part of said alloy film, and which causes eddy current to flow in said alloy film, thereby to afford a heating and cooling profile to said alloy film and to write and erase information in said alloy film.

5. An optical information recording device as defined in claim 4, wherein said coil constitutes a high frequency coil which applies a high frequency, and said high frequency coil is disposed in contact with an insulating film which is formed on said alloy film.

6. An optical information recording device as defined in claim 1, wherein
said alloy film has a first temperature profile which applies low heat energy of comparatively long period thereby to transform said alloy film into a first phase, and a second temperature profile which applies high heat energy for a moment thereby to transform said alloy film into a second phase, and
the first temperature profile erases written information owing to the current caused to flow to said alloy film, while the second temperature profile writes information owing to the current caused to flow to said alloy film.

7. An optical information recording device as defined in claim 6, wherein said alloy film is previously held in a third temperature profile which is lower in temperature and longer in period than the first temperature profile and which does not contribute to the phase transformation.

8. An optical information recording device as defined in claim 6, wherein the writing and erasing of information are performed by the temperature profiles based on the currents caused to flow through said alloy film or a heating member constructed in adjacency thereto, and the reading of information is performed by sensing reflected light of light projected on said alloy film.

9. An optical information recording device as defined in claim 6, wherein a frequency of the current which is caused to flow through the heating means for said alloy film differs depending upon the temperature profiles.

10. An optical information recording device as defined in claim 6, wherein
said alloy film formed on a transparent substrate is irradiated with light from the substrate side, to afford the second temperature profile and to write or erase information, and
written information is erased from the alloy film side by a high frequency heating coil which is disposed in proximity to said alloy film.

11. An optical information recording device as defined in claim 10, comprising means to hold a distance between said high frequency heating coil and said alloy film at a constant value.

12. An optical information recording device as defined in claim 1, wherein said alloy film is deposited on at least one of two surfaces of an insulating substrate.

13. An optical information recording device as defined in claim 1, wherein said alloy film is formed as a plurality of discrete parts on an insulating substrate.

14. An optical information recording device as defined in claim 13, wherein said plurality of parts of said alloy film formed discretely have a stepped structure.

15. An optical information recording device as defined in claim 1, wherein
a protective film is deposited on said alloy film,
said protective film is partly removed and has a plurality of conductive films which are electrically conductive to the recording film, and
said conductive films are connected to said means applying.

16. An optical information recording device as defined in claim 1, wherein said applying means includes an electrode composed of a thermal capacity member and a coil wound thereon, and information is written in and erased from said alloy film by causing the current to flow through said coil.

* * * * *